US010027538B1

(12) United States Patent
Okita et al.

(10) Patent No.: US 10,027,538 B1
(45) Date of Patent: *Jul. 17, 2018

(54) HYBRID COMMUNICATIONS SYSTEM AND METHOD OF OPERATION

(71) Applicant: SHORETEL, INC., Sunnyvale, CA (US)

(72) Inventors: Glen K. Okita, Los Altos, CA (US); Amy S. Pendleton, Austin, TX (US); Laurent Dinard, Mountain View, CA (US); Yaniv Schahar Schwartz, Maplewood, NJ (US)

(73) Assignee: Mitel Networks, Inc. DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/712,380

(22) Filed: Sep. 22, 2017

Related U.S. Application Data

(63) Continuation of application No. 14/011,787, filed on Aug. 28, 2013, now Pat. No. 9,774,495.

(60) Provisional application No. 61/778,713, filed on Mar. 13, 2013.

(51) Int. Cl.
*G06F 15/16* (2006.01)
*H04L 12/24* (2006.01)
*H04L 12/46* (2006.01)
*H04L 29/08* (2006.01)
*H04L 12/911* (2013.01)
*H04L 29/06* (2006.01)

(52) U.S. Cl.
CPC ...... *H04L 41/0803* (2013.01); *H04L 12/4641* (2013.01); *H04L 41/0806* (2013.01); *H04L 41/0813* (2013.01); *H04L 47/824* (2013.01); *H04L 63/0272* (2013.01); *H04L 67/10* (2013.01); *H04L 67/34* (2013.01)

(58) Field of Classification Search
CPC ..... H04L 67/10; H04L 63/0272; H04L 67/34; H04L 12/4641; H04L 12/5695; H04L 41/0806; H04L 41/0813; H04L 47/824
USPC ......................................................... 709/217
See application file for complete search history.

(56) References Cited

U.S. PATENT DOCUMENTS

| 8,201,237 | B1 | 6/2012 | Doane |
| 8,332,517 | B2 | 12/2012 | Russell |
| 9,154,327 | B1 | 10/2015 | Marino |
| 2006/0277603 | A1 | 12/2006 | Kelso |
| 2008/0032729 | A1 | 2/2008 | Luo |

(Continued)

FOREIGN PATENT DOCUMENTS

WO 2012154595 A1 11/2012

*Primary Examiner* — Oleg Survillo

(57) ABSTRACT

A method includes providing account enable data from a multi-tenant hosted communication system to a premises based communications system. The method also includes receiving user configuration data at a remote portal of the hosted communications system, the configuration data including the account enable data and user data describing properties of each of a plurality of users in the premises based communications system including at least one user group to which a subset of the users belongs. The method also includes providing enablement data to the premises based communications system via the portal to identify which resources in the multi-tenant hosted system are enabled for the plurality of users in the premises based communications system based on the user configuration data. Changes in the enablement data further can be synchronized based on changes in the user configuration data received from the premises based communications system via the portal.

20 Claims, 6 Drawing Sheets

(56) References Cited

U.S. PATENT DOCUMENTS

| | | |
|---|---|---|
| 2011/0182283 A1 | 7/2011 | Van Buren et al. |
| 2011/0261946 A1 | 10/2011 | Conroy et al. |
| 2012/0071168 A1 | 3/2012 | Tomici et al. |
| 2012/0179820 A1 | 7/2012 | Ringdahl |
| 2012/0179824 A1 | 7/2012 | Jackson |
| 2012/0203908 A1 | 8/2012 | Beaty et al. |
| 2012/0204169 A1 | 8/2012 | Breiter et al. |
| 2012/0233668 A1 | 9/2012 | Leafe et al. |
| 2012/0265976 A1 | 10/2012 | Spiers |
| 2012/0324069 A1 | 12/2012 | Nori et al. |
| 2012/0331528 A1 | 12/2012 | Fu et al. |
| 2013/0039360 A1 | 2/2013 | Manian |
| 2013/0103837 A1 | 4/2013 | Krueger |
| 2014/0090037 A1 | 3/2014 | Singh |
| 2014/0222907 A1 | 8/2014 | Seligmann |
| 2015/0365497 A1 | 12/2015 | Zhao |
| 2016/0269564 A1 | 9/2016 | Lawson |

HYBRID COMMUNICATIONS SYSTEM AND METHOD OF OPERATION

CROSS-REFERENCE TO RELATED APPLICATION

This application claims priority from of U.S. patent application Ser. No. 14/011,787, filed Aug. 28, 2013 entitled HYBRID COMMUNICATIONS SYSTEM AND METHOD OF OPERATION, which claims the benefit of U.S. Provisional Patent Application No. 61/778,713, entitled PROVISIONING, ADMINISTRATION AND OPERATION OF A HYBRID UNIFIED COMMUNICATIONS SYSTEM, and filed Mar. 13, 2013, each of which applications are incorporated herein by reference in its entirety.

TECHNICAL FIELD

This disclosure relates generally to configuring and operating a hybrid communications system.

BACKGROUND

Hybrid cloud computing relates to a composition of a cloud network and a private premises network that remain unique entities but are bound together, offering the benefits of multiple deployment models. Such composition can expand deployment options for cloud services, allowing information technology (IT) organizations to use cloud computing resources to meet certain needs. By utilizing "hybrid cloud" architecture, companies and individuals are able to obtain degrees of fault tolerance combined with locally immediate usability without dependency on internet connectivity. Hybrid cloud architecture requires both on-premises resources and off-site (remote) server-based cloud infrastructure.

SUMMARY

This disclosure relates generally to configuring and operating a hybrid communications system.

One example relates to a computer-implemented method that includes receiving account enable data at a private network system in response to registering the private network system with a multi-tenant hosted system, the multi-tenant hosted system being programmed to provide resources having features compatible with the private network system. Predetermined user data can be sent, via a portal, to describe properties of each of a plurality of users in the private network system, the predetermined user data including data identifying at least one group to which a proper subset of the plurality of users belongs. Enablement data can be received at the private network system to identify resources in the multi-tenant hosted system that are enabled for the plurality of users. User configuration data can be sent, via the portal, for the plurality of users to the multi-tenant hosted system for provisioning the resources in the multi-tenant hosted system for each of the plurality of users.

Another example includes a non-transitory computer readable medium having instructions executable by a processor to implement a method. The method includes providing account enable data from a multi-tenant hosted communication system to a premises based communications system. The method also includes receiving user configuration data at a remote portal of the hosted communications system, the configuration data including the account enable data and user data describing properties of each of a plurality of users in the premises based communications system including at least one user group to which a subset of the users belongs. The method also includes providing enablement data to the premises based communications system via the portal to identify which resources in the multi-tenant hosted system are enabled for the plurality of users in the premises based communications system based on the user configuration data. Changes in the enablement data further can be synchronized based on changes in the user configuration data received from the premises based communications system via the portal, the portal further providing a mechanism for the premises based communications system to access at least some of the enabled resources in the hosted communications system.

Another example relates to a hybrid unified communications system that includes at least one premises based unified communications system and a hosted unified communications system. Each premises based unified communications system can include a configuration manager to establish and control user properties for the premises based unified communications system. A portal interface can access a portal of a hosted unified communications system via a secure connection. The hosted unified communications system can include the portal that is configured to control and manage enablement and access to at least some hosted resources for users of the premises based unified communications system, the hosted resources providing at least one of a real time or non-real time communications service. The user properties for the premises based unified communications system further can determine enablement and provisioning of the hosted resources for each user and group of users based on user configuration data communicated to the portal via the portal interface.

DETAILED DESCRIPTION

Figure 1:
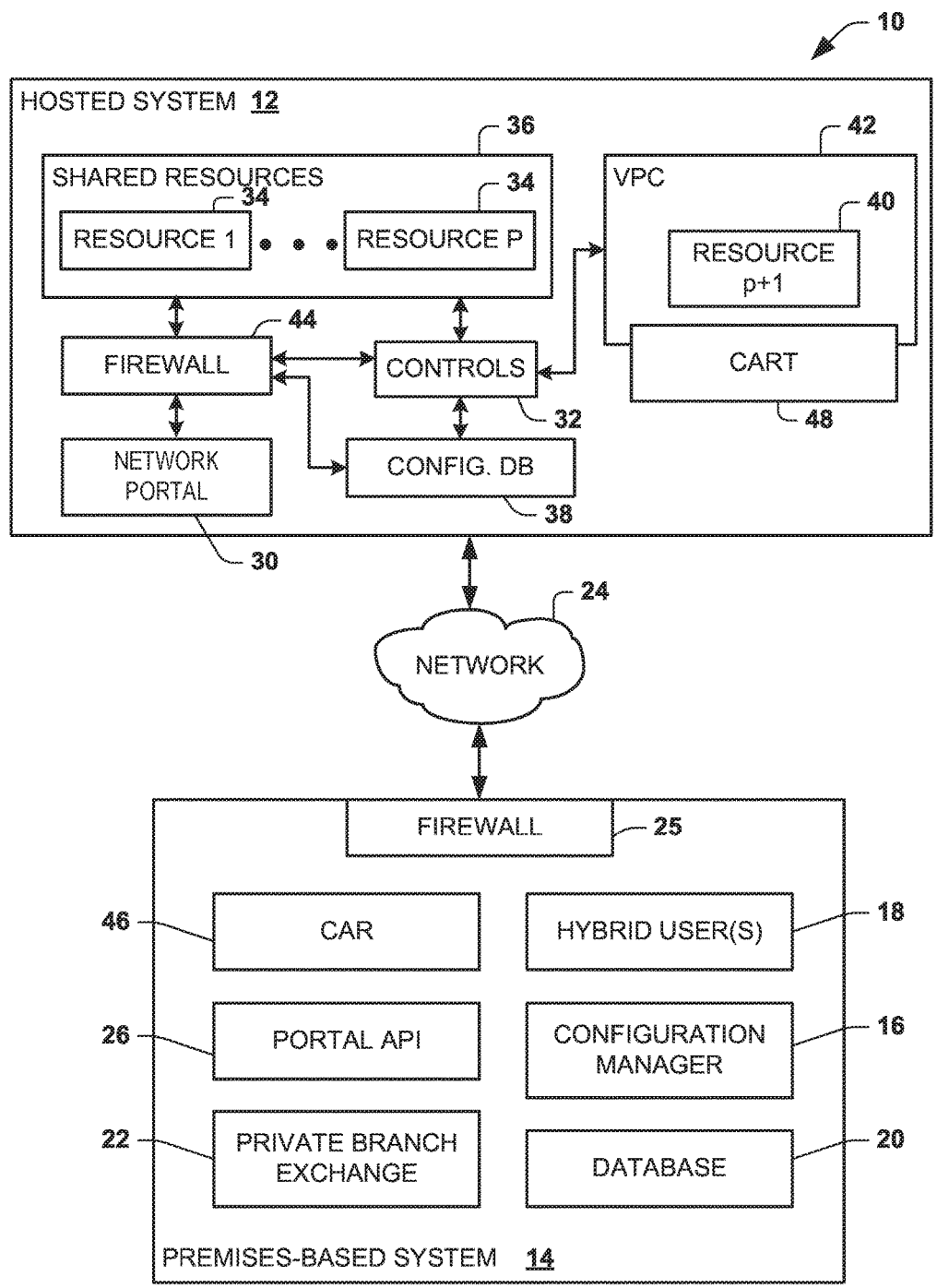
FIG. 1 illustrates an example of a hybrid communications system.

This disclosure relates generally to configuring a hybrid communications system to enable one or more premises-based systems (also referred to herein as a private network) to configure and operate resources of a hosted system (also referred to herein as a multi-tenant cloud-based system). The disclosed approach facilitates coordination of operations performed in the cloud for enabling services while still maintaining control of user configuration by the premises-based system. As an example, the premises-based system receives account enable data in response to registering the private network with a multi-tenant cloud based system, the multi-tenant cloud based system being programmed to provide resources compatible with the premises-based system. The premises-based system can send predetermined user data, via a portal, to the hosted system. The user data can describe properties of each of a plurality of users authorized to operate in the premises-based system, which can include data identifying least one group to which a proper subset of the users belongs. The premises-based system can receive enablement settings data identifying resources in the cloud that are enabled for the plurality of users. User configuration data can be sent to the cloud, via the portal, for the plurality of users to provision the resources in the cloud for each of the plurality of users.

As used herein, the hosted (e.g., cloud) system can be include a variety of hardware and/or software resources that can be supported in a given cloud, including servers, private branch exchanges (PBXs), routers and databases, for example. For example, such resources can include processors, memory, servers, software, applications, that cooperate to provide cloud computing capabilities for users and premises based systems that desire to exploit cloud resources that enhance existing functionality of their premises based system. By way of example, each of the plurality of users of the premises system thus can be provisioned individually or as part of a respective group to utilize the hosted resources. As used herein, a premises based system refers to a private network that is administered and/or operated by or on behalf of a private entity (e.g., a company, group of users, or other service provider) that is different from the entity operating the hosted, cloud-based system. The premises based system can be implemented locally at a single site or it can be distributed across multiple sites but operated as a single enterprise, such as an enterprise unified communication UC system.

As an example, a premises based system can leverage services of a cloud based PBX and/or cloud based UC system to provide additional services and capabilities to users or other entities of a premises based PBX/UC system. For example, a cloud service provider can provision, administer, and bill for services that are provided to one or more premises systems and their respective users. With a minimal amount of setup, users or other entities that are generally administered and based at the premises can take advantage of specific cloud based services for which they have been authorized. In this way, local resources of the premises based system can remain in a given state or condition, and users of such premises system can employ a network connection (e.g., via a secure communications link) with remote hosted resources (e.g., services and/or hardware implemented in a multi-tenant cloud) to access and utilize, seamlessly, additional resources (e.g., cloud resources). For example, the hosted resources can include different yet complimentary resources from those implemented within the premises based system and/or the resources can be duplicative (e.g., redundant or backup resources) to those in the premises based system such as to increase capacity of those in the premises based system.

FIG. 1 depicts an example of a hybrid system 10 that can be implemented. The hybrid system includes a hosted system 12 and a premises based system 14. In this and other examples disclosed herein, the hosted system can include a multi-tenant cloud system configured to provide cloud-based resources for the premises based system 14. While one premises based system 14 is illustrated in FIG. 1, the hybrid system can support any number of premises based systems, such as in which the hosted system provides resources serving a plurality of different tenant customers, as disclosed herein. In the example of FIG. 1 and other examples disclosed herein, the hybrid system is described in the context of a unified communications (UC) system. The UC integrates real-time communication services (e.g., instant messaging (chat), presence information, telephony, mobility, audio conferencing, contact center functions, video conferencing, data sharing, call control and speech recognition) with non-real-time communication services (e.g., integrated voicemail, transcription services, e-mail, short message service, and fax). It is to be understood that the hybrid system 10 is applicable to other types of computing and/or communication systems in which it is desirable to provision and configure users and groups of users outside of the hosted system yet still enable access and use of cloud-based resources.

The premises based system 14 can include a configuration manager 16 configured to provision the premises based system. The configuration manager, for example, can set parameters for a plurality of hybrid users 18 as well as resources that can operate within the premises based system, which parameters can be stored in a database 20 of the premises system 14. In addition to user parameters, in some examples, other configuration data in the database 20 can specify firewall settings for the user network, session border controller settings and quality of service (QoS) settings. The types and extent of parameters for the premises based system 14 can vary depending on the available features, equipment and software running in the premises based system and hybrid resources in the hosted system 12, such as disclosed herein.

The premises based system can implement a variety of resources for implementing communications, including a private branch exchange (PBX) 22. The PBX 22 provides a communications exchange that services a particular entity corresponding to the premises (e.g., a business that may include one or more offices). This is in contrast to a common carrier (e.g., telephone service provider) that operates for many businesses or for the general public. For instance, the PBX 22 of the premises based system 14 can communicate with a service provider, such as via a network 24. Thus, the PBX 22 can include a hardware (e.g., switches, logic lines, routers, conferencing systems, and other controls) and software configured to couple to the network 24 for sending and receiving communications to and from the premises based system 14 as well as for routing, distributing and managing communications within the premises based system 14. The PBX 22 can be configured to implement packet switched calls, such as implementing voice over internet protocol (VoIP), circuit switched calls or a combination of packet and circuit switched communications.

The premises based system 14 can be connected to the network 24 via a firewall 25 to control the incoming and outgoing communications traffic by analyzing the data packets and determining whether or not they should be allowed through, such as based on a programmable rule set. As mentioned above, the premises based system provides a private network (e.g., an intranet) in the hybrid system. While in the example of FIG. 1 the configuration manager 16 is depicted as separate from the PBX 22, it could be implemented (in whole or in part) within the PBX 22. For example, the configuration manager 16 can be implemented as a graphical user interface programmed to access functions and methods to configure and manage the various components of the premises based system 14.

To access the hosted system 12, the premises based system 14 can include a portal application interface (API) 26 configured to access a network portal (e.g., web portal) 30 that is associated with the hosted system via the network 24 (e.g., including the public internet). As disclosed herein, the network portal 30 maintains a linkage (e.g., a mapping)

between users, groups, and other entities as identified within the premises based system with their corresponding identity within the hosted system 12. For example, the portal API 26 can expose functions of the network portal 30 to facilitate and enable hybrid operation between the premises based and hosted systems 14 and 12, respectively. The API 26 can be utilized to send one or more API objects describing user properties and/or enablement of hosted resources according to a predefined schema. The connection via the portal API 26 and the network portal 30 of the hosted system 12 can be implemented as a secure communications protocol over the network 24 connection, such as using https or other protocol. For example, the PBX 22 can employ the portal API 26 for accessing hosted controls 32 and/or shared resources 34, demonstrated as RESOURCE 1 through P where P is a positive integer denoting a number of shared resources 36. The shared resources 36 can correspond to resources that may not require a real time connection with the premises network, such that latency associated with communicating via the secure connection (e.g., https) is sufficient. The controls 32 can include a billing and operations system programmed to configure and enable the resources 34 for use by the premises system 14, such as can be defined by data stored in a configuration database 38.

As an example, each customer premises system 14 can generate a globally unique ID associated with a given user's configuration, which can be stored in the database 20. The globally unique ID (e.g., a GUID) can be uploaded (along with other user properties and additional configuration) to the network portal 30. The GUID can be unique across all such customer premises systems (even across multiple instantiations of such systems at different customers). When the network portal 30 then sets up configuration in the hosted system for the given user, it maintains a mapping between an identity that is established in the hosted system for the premises user and the user's identity in the premises system 14.

The configuration database 38 in the hosted system 12, for example, can store data specifying account information for the premises system as well as enablement data and configuration settings for hosted resources, including the shared resources 34 and private resources 40. For example, the private resources 40 can be implemented as part of a virtual private cloud (VPC) 42 within the hosted system 12. The VPC 42 can provide configurable pool of one or more shared computing resources 40 that can be isolated between the tenants (e.g., different premises based systems) of the hosted cloud system 12. The isolation between tenants of a public cloud is performed via access control mechanism, and a firewall (not shown) can be provided between the controls 32 and the VPC 42 to increase such isolation. With the introduction of isolation levels the providers multi-tenant architecture is effectively transformed to a single-tenant architecture that includes dynamically dedicated resources for the premises based system 14. Some or all of the configuration and enablement of hosted resources 34 and 40 can be further constrained according to a service level agreement between the proprietor entity for the premises based system and the entity providing the hosted system 12.

As an example, the network portal 30 can provide a remote interface to the hosted system 12, such as can be implemented as a including website that can be accessed by an authorized user of the premises based system 14. The network portal 30 can be implemented as part of the hosted system 12 or it can be separate from and provide an interface to the hosted system. In the example of FIG. 1, the network portal 30 resides outside of a firewall 44 that controls traffic into and out of the hosted system 12. In other examples, the firewall can be omitted and the traffic control can be controlled by the network portal 30. As a further example, an authorized user can access the functions of the network portal 30 via the portal API 26 from within the configuration manager 16. As mentioned above, the PBX 22 as well as other premises-based resources (e.g., hardware and/or software) can also employ the portal API 26 to access resources 34 in the hosted system 12. Thus, the functions of the network portal 30 can be accessed in a variety of ways.

The premises based system 14 can also include one or more client access routers (CAR) 46 configured to provide for communication of data packets along a prescribed communications path to the hosted system 12. In some examples, the CAR 46 can be a headless network device that is installed on the user premises based system 14. The CAR 46 can include or be coupled to a network interface (not shown) to access the network 24 through the firewall 25. For example, the CAR 46 can be configured for communications with a CAR termination (CART) device 48 in the hosted system 12. The connection between each CAR 46 and the CART 48 thus can provide a secure real time connection to each resource 40 in the VPC 42. For example, the resource 40 can be a telecommunication resource (e.g., a switch, an audio and/or video conferencing system or the like).

By way of example, the CAR 46 implemented in the premises system 14 of FIG. 1 and other examples herein can be configured and operate according to the approach disclosed in co-pending U.S. patent application Ser. No. 13/739,371, and entitled "Automatic Configuration of a Network Device", which is incorporated herein by reference in its entirety. Additionally, the configuration of the CAR 46 can be controlled based on methods implemented in the network portal 30. For example, in response to connecting with the network portal in an authorized manner, such as by logging in with appropriate credentials, the network portal can connect to and configure the CAR 46 to facilitate and enable direct connection to the CART 48 within the hosted system 12. Thus, the CAR 46 can establish a VPN connection between the premises based system 14 and the hosted (e.g., cloud) system 12.

As an example, communication between the CAR 46 and CART 48 can be implemented according to a multiprotocol label switching (MPLS) mechanism to direct data from the CAR 46 in the premises based system 14 to the CART in the hosted system 12. Such mechanism is based on short path labels rather than long network addresses, avoiding complex lookups in a routing table. The labels identify virtual links (e.g., paths) between distant nodes rather than endpoints. MPLS can encapsulate packets of various network protocols. MPLS mechanisms can support a range of access technologies, such as including T1/E1, ATM, Frame Relay, and DSL to name a few.

Further to the example of the premises based system 14 being implemented as a UC system, various features are often assigned to different users based on their respective roles and functions within the business organization. Roles of different users are not static, however but often vary over time. The various properties of a user within the premises based system 14 thus can change. Additionally, the related identity of a given user within the hosted system 12, being a multi-tenant system, will often be different from that of the premises based system. For example, users from different premises based systems will need to be differentiated apart from the hosted system, whereas the identities within the premises based systems may be similar or in some cases the same. Additionally, the addition of the resources from the hosted system 12 to a given to a premises based system 14 to require relatively simple setup while still allowing the administrators of the premises based system control over properties of each of the users within the premises based system and control over local resources and equipment operating in the premises based system. With this mind, FIG. 2 illustrates an example of a signaling diagram that demonstrates how resources in the hosted system 12 can be enabled and configured for use by the premises based system 14.

Figure 2:
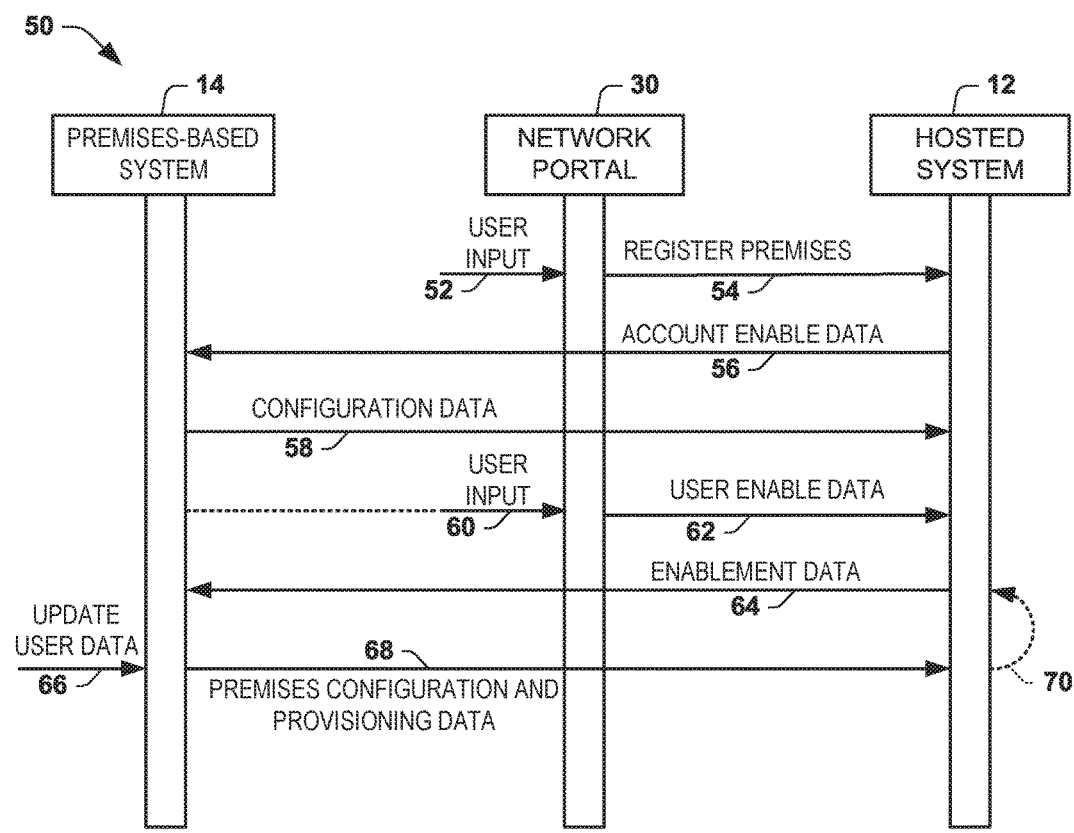
FIG. 2 illustrates an example of a signaling diagram.

FIG. 2 illustrates an example of a signaling workflow diagram 50 that demonstrates how resources in the hosted system can be configured for the premises based system 14. In the example of FIG. 2, the reference numbers refer to the respective components introduced in relation to FIG. 1. It is further presumed that in the beginning of FIG. 2 that the premises based system is not operational with the hosted system 12. Reference is made back to the example system 10 of FIG. 1 to provide additional context for the workflow 50.

An authorized user of the premises based system 14 can log into the network portal 30 to register the premises based system for hybrid operation with the hosted system 12. For example, the authorized user can be provided a predetermined resource location corresponding to the network portal 30. The user can input (user input at 52) an initial set of credentials, such as can include a user name and password. In response to the user input, the premises based system can be registered (at 54) by establishing an associated account for authorizing the premises based system for hybrid operation with the hosted system 12. In response to the registration of the premises, the hosted system 12 can provide account enable data (at 56) that is provided to the premises based system 14. The account enable data can be provided to an administrator or other authorized person within the premises based system, such as in a message (e.g., email, SMS message or the like) provided to the authorized person or to a data storage location in the configuration system.

For example, the account enable data can include a token and an account identifier that can be utilized for further authorization and access to the network portal 30 and to the resources within the hosted system 12. The token can be manually entered into the premises system in response to a user input (e.g., typed or copied into a data entry field of a web form). The token in conjunction with the account ID can be utilized to authenticate the respective premises based system 14 with the hosted system 12. The combination of token and accountability thus can be utilized to secure and identify each premises based system in the multi-tenant hybrid system 10.

By way of example, the premises based system 14 can provide configuration data (at 58) to the hosted system 12 via the network portal 30. The connect configuration data can include configurations, properties and user data for each of the plurality of users in the premises based system. That is, in response to the token and account ID being entered to authenticate the premises based system 14, the entire list of users and user groups for the premises system can be provided to the network portal. As a further example, the token and account ID that have been generated can be provided as header information in subsequent messages and communications provided from the premises based system 14 to the hosted system 12. The configuration data for the users can be generated based upon user properties stored in user tables stored in the database 20 of the premises based system 14.

An example of the configuration data that can be for each of the plurality of users is provided below in Table 1.

TABLE 1

| USERNAME | A user identifier for each user in a given premises system. |
|---|---|
| GUID | Globally unique identifier for the user in both the premises system and the hosted system. |
| DN | A routable Directory Number for a device, user or Workgroup in the premises system. |
| User Type | A field to differentiate between the types of DNs, such as a workgroup and user. |
| First Name | User's first name. |
| Last Name | User's last name. |
| User Email | One or more email addresses for the user. |
| Mobility Username | Username (a shadow username or primary user name) for the user's mobile device(s). |
| Mobility Password | SIP password for user's mobile device (either a password for a shadow user or a primary user's SIP password). |

Once the configuration data has been provided to the hosted system 12 and stored in the configuration database 38, the authorized user can access the network portal in response to a user input (at 60) (e.g., using the token and account ID that have been generated for the premises based system) to provide user enable data (at 62) to provision various resources for the hybrid users 18 of the premises based system 14. The user input 60 can be provided by the user to the network portal (e.g., via a web browser) or it can be provided from a GUI implemented at the premises based system (e.g., as part of the configuration manager 16). For example, as demonstrated by the dotted line associated with the user input 60, the configuration manager 16 of the premises system 14 can provide the configuration data to the network portal 30 via the portal API 26, which in turn can be stored in the configuration database 38 of the hosted system 12. The user enable data can enable hosted resources (e.g., resources 34 and 40) for each or a subset of the hybrid user 18 of the premises based system 14. The user enable data can assign hosted resources to each of the users individually. Alternatively or additionally, hosted resources can be enabled for users according to a group to which each respective user currently belongs. In this way, existing work groups can be leveraged from the premises based system and utilized for enabling services.

As yet another example, the workflow 50 could be configured to enable an authorized user to enter user input 60 via a GUI implemented directly at the premises system 14 (instead of at the network portal 30, as shown). In this other example, the user enable data 62 thus would flow from the premises-based system 14 to the hosted system 12. Since the network portal 30 is effectively bypassed in this approach, another mechanism can be employed to securely authorize the user on the premises system for accessing the hosted system 12.

To facilitate use of hosted resources within the hosted system 12, the hosted system 12 can provide enablement data (at 64) to the premises based system 14 based on the user enable data provided via the network portal 30. The enablement data thus can specify which resources have been enabled for each user and each identified group of users. By specifying or assigning resources in relation to a respective group, as a user might move from one group to another, the resources for the current group can be dynamically modified for a respective user according to the user's current group.

By configuring the hosted system 12 to control the enablement of resources (e.g., as the source of truth regarding enablement) and in turn providing corresponding enablement data to the premises based system 14, conflicts can be avoided reducing complexity of the implementation at both the premises based 14 and hosted systems. Thus, the configuration manager 16 is responsible for a particular set of user settings at the premises system 14, and the hosted system 12 is responsible for another distinct set of user settings to mitigate conflicts as disclosed herein. For example, enablement of hosted resources can be set via the network portal 30, whereas other user settings and properties can be managed and controlled via the configuration manager 16 of the premises based system. The different sets of user parameters cooperate to simplify provisioning and use of hosted resources by the premises system.

As mentioned, if the authorized user modifies configuration properties for one or more users at the premises based system (e.g., update user data 66), premises configuration and provisioning data can be provided to the network portal 30 (at 68), such as via the portal API 26. For example, the updated premises configuration and provisioning data can be provided at 68 in response to the database trigger or at a predetermined timing interval from the last update. The timing interval can be programmable in response to the user input at the premises based input. The premises configuration and provisioning data that is provided can in turn utilized to update the configuration database 38, such as demonstrated by dotted line 70. In response to changes resulting from the update, corresponding enablement data may be returned (at 64) from the hosted system to the premises based system 14 via the secure connection. As disclosed herein, different resources in the hosted system 12 can require different provisioning via the configuration manager 16, such as to add or remove the users to utilize different resources.

Returning to the example of FIG. 1, the configuration manager 16 of the premises based system can be programmed to enable and disable resources for the respective users via the portal API 26. As mentioned, this can be performed on an individual user basis or on a user group. The network portal API 26 can be implemented as a representational state transfer (RESTful) API that can be utilized to export user configuration data to the network portal 30 or as well as to pull settings from the network portal, including the enablement data for the users and user groups. In other examples, an authorized user can directly utilize the network portal 30 (from within or external to the premises system 14) to modify the enablement properties for users or user groups in the hosted system 12. An example of the network portal API is provided below in Table 2.

TABLE 2

| HEADER | |
|---|---|
| TIMESTAMP | This timestamp will be generated when the changes are saved to the configuration database. |
| ACCOUNT ID | A unique identifier for the hosted system to identify each premises system. |
| ACCOUNT TOKEN | A unique identifier (e.g., a character string) used to authenticate the premises system. |

TABLE 2-continued

| HEADER | |
|---|---|
| OBJECT DATA | |
| USER OBJECT DATA | A consolidated set of user parameters from the premises system (see, e.g., Table 1 above) for any number of users. |

Figure 3:
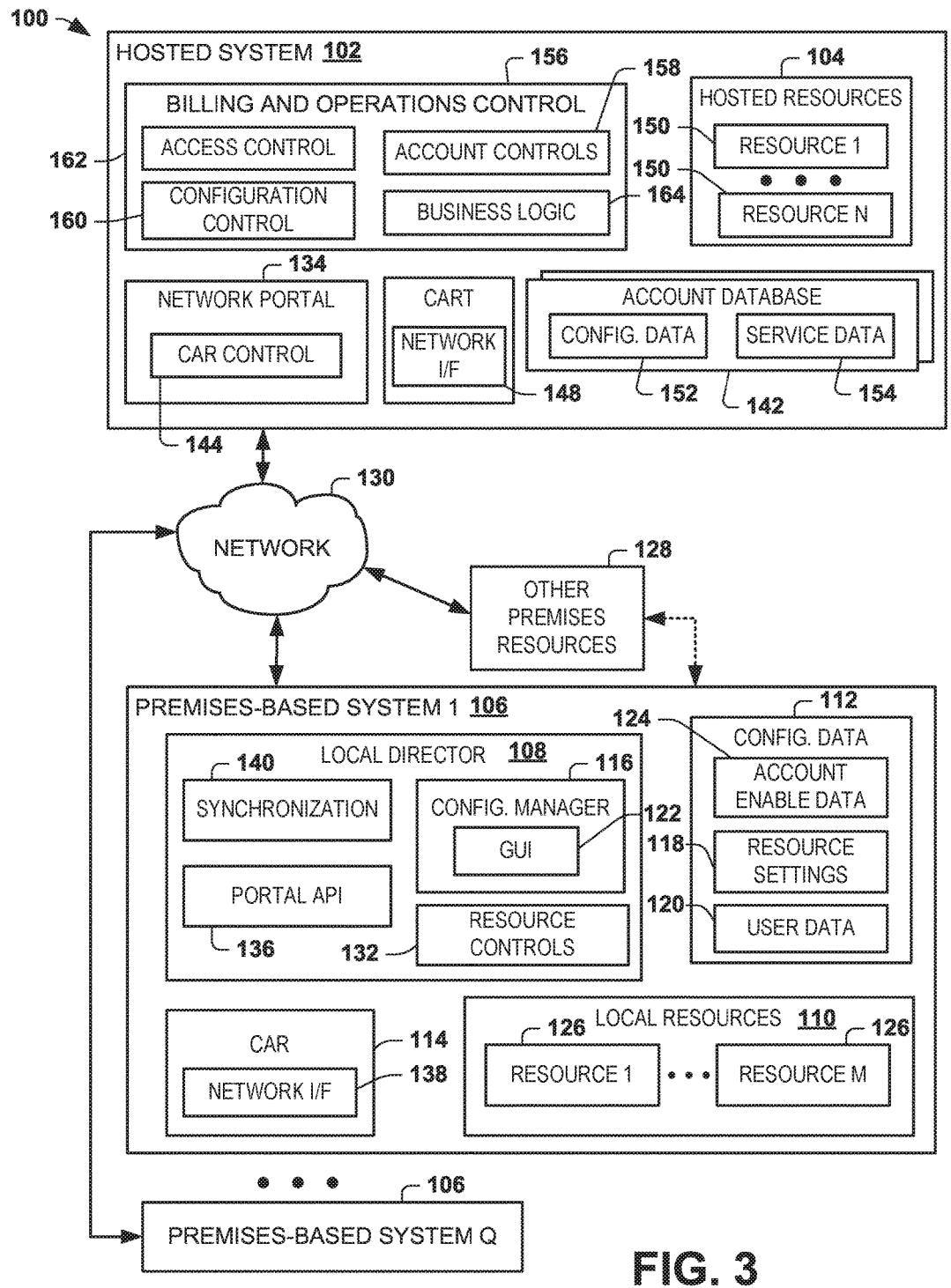
FIG. 3 illustrates an example of another hybrid communications system.

FIG. 3 depicts an example of another hybrid communication system 100. The system 100 includes a multi-tenant hosted system 102 that includes a plurality of hosted resources 104 for a plurality of tenants or customers demonstrated in this example as premises based system 1 through premises based system Q, where Q is a positive integer. In the example of FIG. 3 various features of premises based system 106 are demonstrated as including a local director 108, local resources 110, configuration data 112 and a CAR 114. Each of the other premises based systems 106 in the system 100 can be similarly configured to enable hybrid operation, the details of which have been omitted for purposes of simplicity of explanation.

The local director 108 includes a configuration manager 116 that can be utilized for configuring the features and settings of the premises based system 106, including various aspects of the configuration data 112. For example, the configuration data 112 can include resource settings 118 and user data 120 that can be programmed for operation in the hybrid system 100. The resource settings 118 can include various configurations and properties of the local resources 110 as well as certain information associated with the hosted resources 104. The user data 120 can include data specifying the various properties and associations of the users of the premises based system 106. The configuration manager 116, for example, can provide a graphical user interface (GUI) 122 to enable authorized users to view and modify settings as to control operation and access to features within the premises based system 106 and, if enabled, hosted resources 104 in the hosted system 102, which settings and features are defined by the configuration data 112. The configuration data 112 can also include account enable data 124 that, in response to setting up the premises based system 106 for operation and the hosted system 102, can specify features that are provisioned in the hybrid system 100. Prior to hybrid operation, the account enable data 124 can include an enablement data associated with the local resources 110 for providing operation of the premises based system.

The local resources 110 can include a plurality of various resources 126, identified as resource 1 through resource M, where M is a positive integer. The local resources 110 can be accessed within the premises based system 106 via a local area network (LAN). Additional premises resources 128 can be accessed and utilized by the premises based system 106 via connection to another network that is external to the LAN of the premises based system, for example. The network 130 can include a combination of network infrastructure, such including local area network, wide area network or a combination thereof. The network 130 can include wireless networks as well as physical networks (e.g., fiber or electrically conductive cables) and can operate according to various network protocols. The local director 108 can also include resource controls 132 that are utilized to control access to available resources by the respective users based upon the configuration data 112. The available resources can include the local resources 110 as well as the hosted resources, if provisioned.

As disclosed herein, an authorized user for the premises based system 106 can access a network portal 134 of the hosted system 102 to set up an associated account for utilization of the hosted resources 104. Each premises based system 106 thus includes an account ID and a token for authentication in the hosted system 102. The account ID and token can be entered into the local director 108 via the configuration manager 116 to enable the access to the network portal 134 via an associated portal API 136, for example. Once access has been enabled in this manner, the local director 108 can be configured to send the list of users and associated profile data for each respective user to the network portal for storage in the configuration data 152 of the account database 142. For example, the local director 108 thus can employ the portal API 136 to send such configuration data for each of the respective local users to the hosted system as well as to retrieve account enable data for the hosted resources 104.

After the premises based system 106 has been configured for hybrid operation with the hosted system 102, a synchronization module 140 can operate to maintain synchronization between the configuration data 112 of the premises based system 106 and corresponding enablement data that is stored in an account database 142 in the hosted system 102, such as disclosed herein. For example, the synchronization module 140 can periodically (e.g., at least every 24 hours) query from the private network system, via the network portal 134, for current configuration data. In response, the network portal 134 can retrieve updated user enablement settings from the configuration data 152 can send the updated settings to the local director 108 for updating the account enable data 124 accordingly.

The CAR 114 can include a network interface 138 configured to enable secure communications between the premises based system 106 and the hosted system 102 via the network 130. As an example, the CAR 114 can be configured for auto-configuration by connecting to a predetermined resource location (e.g., a network address) corresponding to the network portal 134. The CAR 114 can connect to the predetermined resource location in response to being powered up and connected to the network 130 via the network interface 138 while in an unconfigured state. The network portal 134 further can include CAR control 144 that is configured to provide initial configuration data to the CAR 114 for configuring the CAR for operation in the hybrid system 100. For example, the CAR control 144 can provide resource locations and virtual path data to enable the CAR 114 to connect via the network 130 to a CAR termination (CART) 146 of the hosted system 102.

The CART 146 can also include a network interface for coupling to the network 130. The CART 146 can provide a secure communication mechanism between one or more CAR 114 operating within the premises based system 106 and specified hosted resources 104 that have been enabled for such premises based system. The connection between the CAR 114 and CART 146 can thus provide a secure high speed tunnel to enable real time communication services between the premises based system 106 and the hosted system 102. For example, the hosted resources 104 can include a plurality of hosted resources 148 demonstrated as Resource 1 through Resource N, where N is a positive integer. One or more of the resources 148 can correspond to real time communication services (e.g., mobility, video conferencing, telephone conferencing, presence information or the like). In this way, such real time communications for a user for which the resources have been enabled can be sent between the CAR 114 and the CART 146 to utilize the corresponding resources 150.

As disclosed herein, the enablement and the control of the resources 150 are based on information stored in the account database 142 which can include configuration data 152 and service data 154. For example, the hosted system 102 can include a billing and operations control 156 (e.g., corresponding to the controls 32 of FIG. 1) that is configured to control configuring and provisioning the hosted resources 104, configuring devices and components in the hosted system and supporting business operations for its customers such as by supporting processes, processing bills and collecting payments. In the example of FIG. 3, the billing and operations control 156 can include account controls 158 programmed to establish and manage an account for each of the premises based system 106. The account controls 158 generate the token and account ID for a new customer that can be provided through the network portal 134 to one or more authorized user for use in establishing services in the hybrid system 100. Data associated with the given account can be stored in the account database 142 such as part of the configuration data 152. A replacement token can also be generated by the account controls 158 such as in response to a request from an authorized user and/or response detecting that a token may have been compromised.

The billing and operations control 156 can also include configuration control 160 that is utilized to control configuration and allocation of hosted resources 104 for use by the respective premises based systems 106. The configuration control 160 can thus update and store the configuration data 152 to control which of the resources 150 can be utilized by any of the respective premises based system 106 and the extent of such use. The configuration control 160 can further work in conjunction with other functions of the billing and operations control to effect an appropriate level of service. The configuration control, for example, can cooperate with the network portal 134 to control writing and reading configuration properties from the configuration data 152. For instance, the configuration control 160 can modify the configuration data 152 in a response to user configuration data that is provided (e.g., via the portal API) from the premises based system 106. The configuration control 160 can also selectively provide enablement data to the premises based system 106, which can be stored in conjunction with the account enable data 124 for enabling corresponding hybrid operation with the hosted resources.

As a further example, an access control component 162 can be programmed to control access to the respective resources 104 based on the configuration data 152 and business rules that have been established. The business rules can be implemented as business logic 164 programmed to control a level of service for a premises based system 106. The level of services can be controlled according to a service level agreement between the host entity of the hosting system and the entity in control over the premises based system 106. The business logic 164 can also track usage by each of the premises based systems of the respective resources and store such usage in the service data 154. The service data can in turn be tracked for billing services depending upon subscription and other ways in which the premises based system contracts for use of the hosted resources 104.

Figure 4:
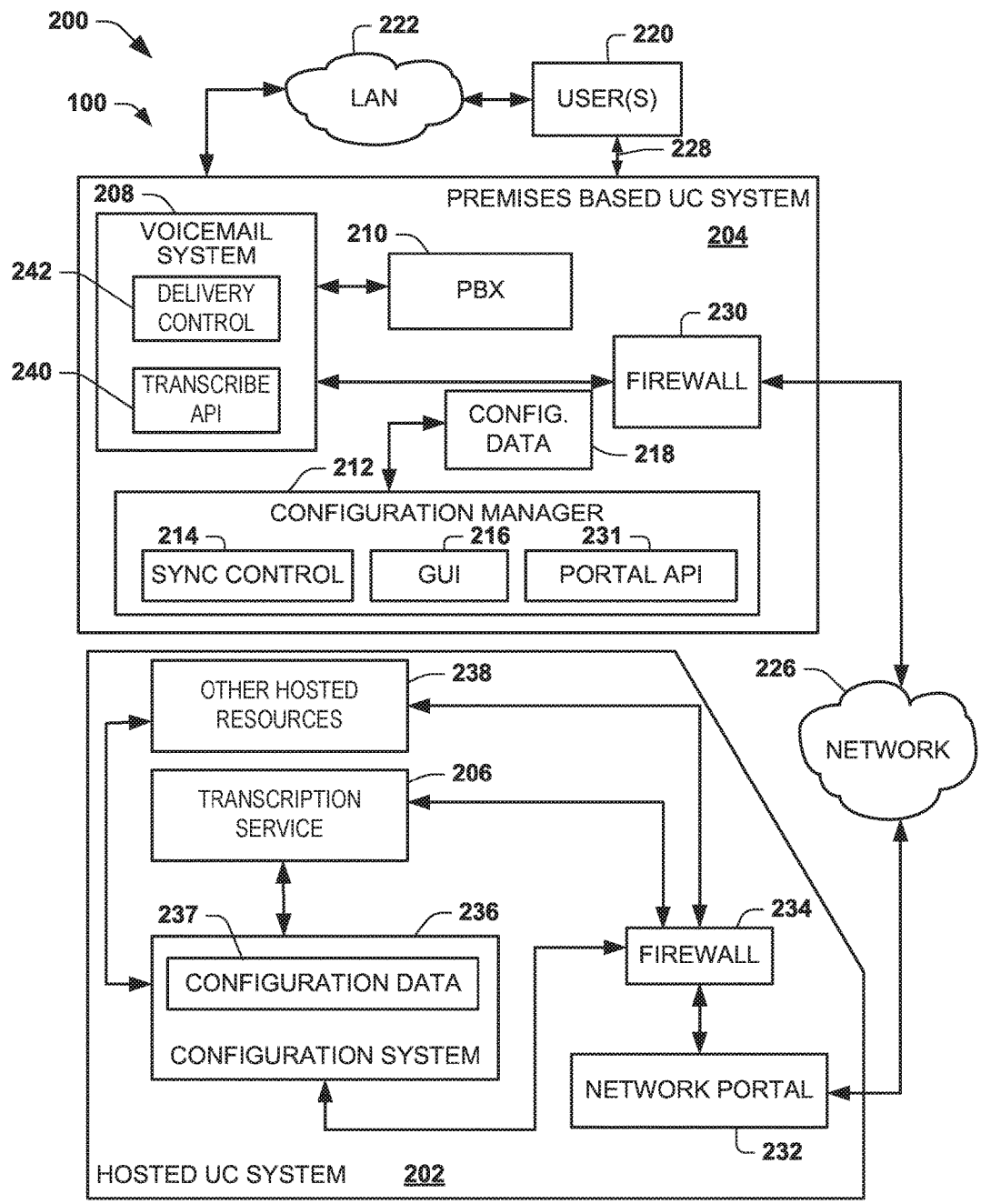
FIG. 4 illustrates an example of another hybrid communications system that can provide hosted transcription services.

FIG. 4 depicts an example of another hybrid communication system 200 that can provide one or more non-real time hosted services within a hosted UC system 202. The example of FIG. 4 demonstrates the hosted service in the context of a hosted transcription service 206, although the approach is equally applicable to other hosted resources (e.g., fax services, SMS services or the like). The transcription service 206 can be enabled and utilized by any number of premises based UC systems 204 operating in the hybrid system 100. For example, the transcription service 206 can be provided to authorized premises based UC system 204 using voice recognition software that can be implemented at or accessible by the transcription service 206.

In the example of FIG. 4, the premises based UC system 204 includes a voicemail system 208 and a private branch exchange (PBX) 210. The voicemail system 208 is demonstrated as separate from the PBX 210; however, the voicemail system could be implemented within or in conjunction with PBX. A configuration manager 212 includes a synchronization control 214 and a GUI 216. The configuration manager 212 can provide and utilize configuration data 218 to control operation of the premises based system in the multi-tenant hybrid environment provided by the system 200. An authorized user thus can access the GUI 216, as disclosed herein, to set properties and parameters for each of the plurality of users 220 of the premises system.

The voicemail system 208 can be configured to provide voicemail messages to each of the subset of the users 220 via a connection. In some examples, the voicemail messages can be provided to a recipient via a local area network 222. In other examples, the voicemail system 208 can provide the voicemail message to the recipient via a wide area network, such as corresponding to the network 224 that interconnects the premises based system 204 and the hosted UC system 202. Additionally, while users are demonstrated as being connected to the premises based system via the LAN 222, users could alternatively be connected to or operate within the premises based system 204, demonstrated schematically as direct connection 228. Each of the components of the premises based UC system 204 (e.g., voicemail system 208, PBX 210, and configuration manager 212) can be connected to the network 226 via a firewall, such as disclosed herein. The configuration manager 212 further can include a portal API 231 to access a network portal 232 at the hosted UC system 202. The network portal 232 may reside outside the firewall 234 of the hosted system 202, such as shown.

The hosted system 202 can also include a configuration system 236 that is configured to control configuration and operation of the hosted system (e.g., corresponding to a building and operations control 156 of FIG. 3). For example, the configuration system 236 can include configuration data that is utilized to control access to and use of cloud resources, including the transcription service 206 as well as one or more other hosted resources 238. Each of the hosted resources 206 and 238 can be coupled to the network portal 232 for receiving resource requests from the premises based UC system 204. The communication over the network between the premises based UC system 204 and the hosted UC system 202 can be a secure connection (e.g., via https or similar protocol).

By way of example, the voicemail system 208 can include a transcribe API 240 and delivery control 242. The transcribe API 240 can expose functions associated with the transcription service 206, which can enable the voicemail system to request audio from a message to be transcribed and send a corresponding voicemail message. The voicemail system thus can send the audio as a file to the transcription service 206 via the network portal 232. For example, the transcribe API can be utilized to send a transcribe request to the transcription service 206 that includes the following information (a directory number GUID, a GUID for the voicemail message, caller name, caller number, email address to send to, an indication that an audio file is attached to the message, an indication of a level of importance (urgent, normal, low priority, etc.), a date and time field for the message, and identifying of an encoding format).

In response to the transcribe request, the transcription service 206 can in turn transcribe the message into a corresponding text based upon the configuration data associated with the transcription service that has been enabled for the respective user. The transcription service can control the transcription based on transcription properties stored in the configuration data 237. For example, the configuration data 237 can specify transcription properties to constrain the use of the service for a given user or for a group of users, such as to a predetermined length of time for each audio message or it can be restricted according to an amount of transcription (e.g., based on a time constraint or the number of characters) allowed in a given billing cycle (e.g., the period of a month).

Additionally, the delivery control 242 of the voicemail system 208 can control delivery of the voicemail message to the recipient user 220. For example, the delivery control 242 can be configured to immediately send a copy of the voicemail audio to the user via the LAN 222 or via the network 226 or to a plurality of resource locations such as can be contained in an email or other form of messaging. In some examples, the delivery control 242 can be programmed to delay delivery of the voicemail message until such time as the transcription has been completed. For instance, the delivery control 242 can receive an indication from the transcription service 206 via the transcribe API to indicate that the transcription has been completed and is being sent to the user. The delivery timing and synchronization between the transcription and the delivery of the voicemail can thus be synchronized and programmed according to user requirements.

Additionally or alternatively, the voicemail system 208 can deliver the audio voicemail message to the user in one or more formats. For example, the voice mail system can provide the voicemail as an attachment to an email in a predetermined format that is sent to one or more email addresses for the respective user. The voicemail system 208 can also provide the audio message in another format to the users phone (e.g., a VOIP phone, a POTS phone, a soft IP phone or the like).

As a further example, the other hosted resources 238 can include a facsimile resource. Authorized premises based users thus can employ the hosted fax service 238 in the cloud to send and receive faxes, such as using emails to a cloud based service. For examples, the emails can be sent to a predetermined address (e.g., to fax@cloudservice.com) associated with the hosted resource 238 for outgoing faxes. Incoming faxes to a given telephone number associated with a respective user 220 can be mapped to one or more predetermined email address for such user, such as based on the user configuration information that is provided to the network portal 232 at set up.

Figure 5:
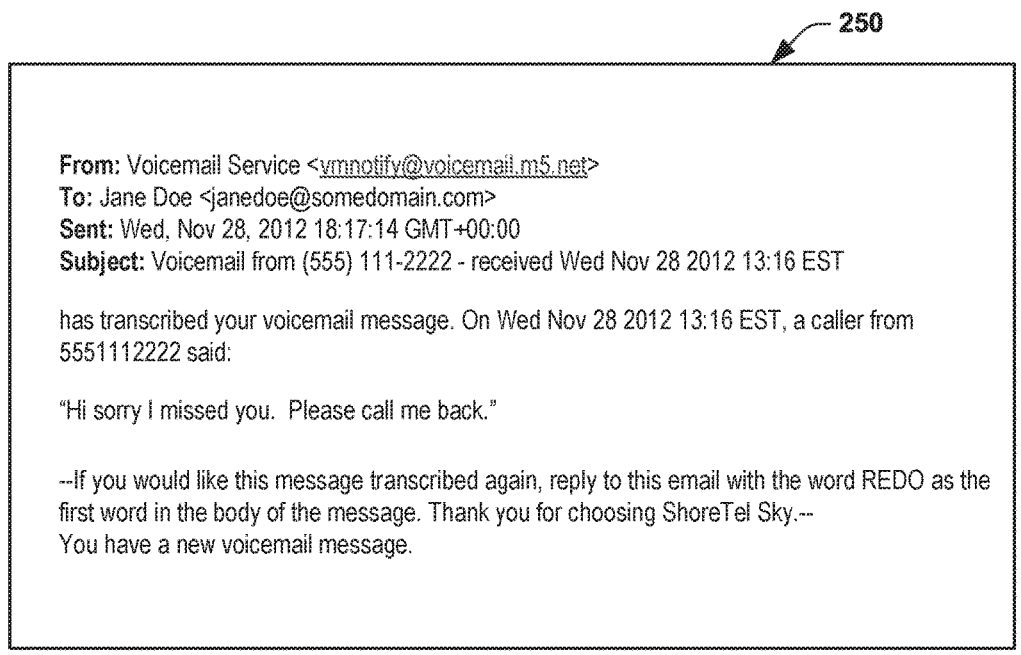
FIG. 5 depicts an example of a transcribed email that can be generated by the system of FIG. 4.

FIG. 5 depicts an example of a message 250 that can be sent to the user by the transcription service 206. The email address to which the message 250 is sent can be provided in the request data that is submitted via the transcribe API 240 to the transcription service 206. In other examples, the email address to which the message 250 can be sent can be stored as part of the configuration data 237 for each respective user.

In addition to transcribing an audio voicemail message in response to a request provided via the transcribe API 240, the transcription service 206 can also transcribe other voice audio or implement re-transcription in the event there may be errors or additional information may be required by the user. For example, a user can reply to the message 250 that is provided to the user with one or more particular key words (e.g., redo) at a predefined location of the reply message to cause the transcription service 206 to re-transcribe the original message. In addition to transcribing voicemail, the transcribe API 240 may be leveraged by one or more other applications for sending voice audio data to the transcription service 206, such as to transcribe voice memos or other audio voice recordings. The availability of such services and the extent to which such service can be utilized by to other applications can be defined in the configuration data 237, which further can be limited to according to subscription and enablement parameters.

Additionally, the voicemail system 208 can be configured and process voicemail messages differently based on properties of a given voicemail messages. For example, message properties can include an identification field to indicate if a message has been set to high indicating an urgent voicemail or to indicate that a message is to be a private mail for the intended recipient. The properties of the voicemail message can be set by the caller leaving the message in response to a user input (e.g., DTMF tones or voice commands provided from the caller to set such properties). Alternatively or additionally, the properties of the voicemail message can be set by the voicemail system 208 based on analysis of call data (e.g., metadata representing the caller name, calling number or the like). The voicemail system 208 in turn can exclude private voicemail messages from being transcribed based upon the properties identifying the voicemail as private as well as to control the timing and delivery of the audio data corresponding to the message to the transcription service depending on the prioritization in the voicemail message.

In other examples, in the event that a transcription fails or errors are otherwise produced and detected by the transcription service 206, the voicemail system 208 can send an email to the user indicating that the transcription has failed. Additional data corresponding to the transcription can be logged and stored in the hosted system 202 such as can be stored as part of the configuration data. Additionally, the statistics and information associated with each request for transcription and the transcription thereof can be stored locally as part of the configuration database to enable each respective user to access information related to the users respective transcription utilization. Such information can be stored locally according to each transcription request and information that is provided from the transcription service 206.

Figure 6:
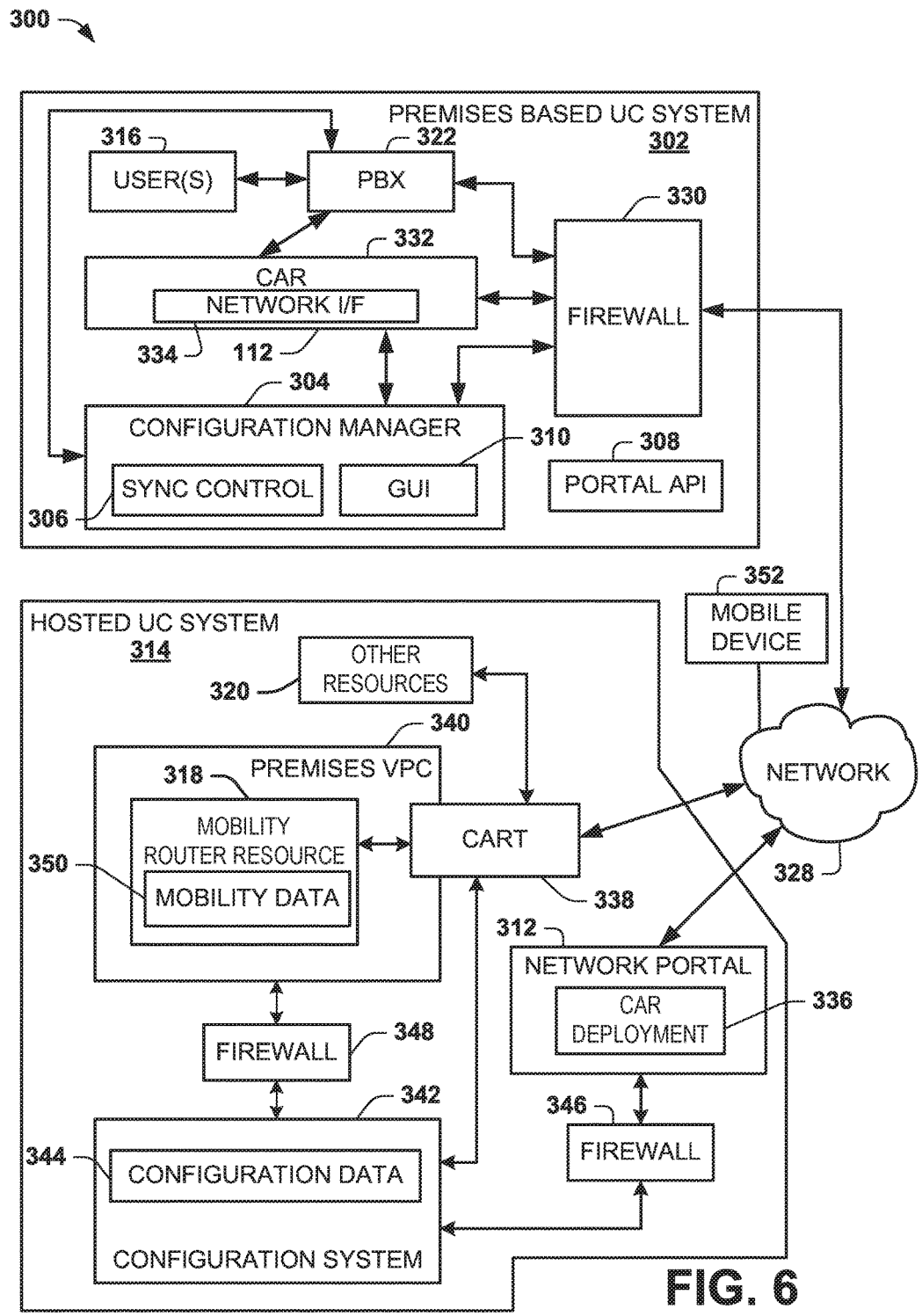
FIG. 6 illustrates an example of yet another hybrid communications system that can provide hosted mobility services.

FIG. 6 depicts an example of yet another hybrid communication system 300 that can provide hosted real time communications services for one or more premises based UC systems 302. In the example of FIG. 6, the premises based UC system 302 includes a configuration manager 304 that can include a synchronization control 306, a portal API 308 and a GUI 310. The portal API 308 can be utilized to access a network portal 312 residing in a hosted UC system 314, such as disclosed herein (e.g., see FIGS. 1 and 2).

The configuration manager 304 can be programmed to configure a provision real time communication services for use by one or more users 316. In the example of FIG. 6, the real time communication services are demonstrated as including mobility router services hosted by the hosted system 314. The mobility router resource 318 allows users to make and receive calls from both the enterprise and personal mobile phone numbers by automatically selecting an optimal network (Wi-Fi or cellular) and implementing automatic network handover. The type of call (enterprise or cellular mobile) can be selected by a client application (e.g., machine readable instructions) executed by processor on a user's mobile device 352 such as to optimize cost, call quality and battery life. For example, the mobile device 352 can be implemented as a table computer, a smart phone. The hosted UC system 314 can also implement other types of real time communication services, demonstrated as other resources 320 (e.g., corresponding to audio conferencing, video conferencing, data sharing or the like).

The premises based UC system 302 can also include a PBX 322 configured to provide various telecommunication functions for the premises based system 302. The premises based UC system 302 can be coupled to the hosted UC system 314 via a network 328. The premises based system 302 further can include a firewall 330 to provide additional isolation for the premises based system relative to the external network 328. The PBX 322 and a connection manager 304 can be coupled to the external network 328 via the firewall 330. The premises based UC system 302 can also include one or more CARs 332 connected to the network also via the firewall 330. The CAR 332 can further include a network interface 334 to enable the connections to the network 328.

The CAR can be of the type disclosed herein above and disclosed in the above incorporated U.S. Patent Application. The CAR 332 further can be configured automatically based on the disclosure in the above-identified application, for example, by accessing the network portal 312 upon initial activation and connection to the network via the firewall 330. The network portal can include a CAR deployment method 336 that can provide configuration details to the CAR 332 in response to an initial connection request. The configuration information can enable connection between the CAR 332 and the corresponding CART 338 residing in the hosted UC system 314. The connection between the CAR and the CART 338 can thus provide a VPC 340 for the premises based UC system 302. In the example of FIG. 6, the premises VPC 340 can include the mobility router resource 318 as well as other resources 320 that may require real time communications.

As disclosed herein, the hosted UC system 314 can also include a configuration system 342 that includes configuration data 344 for controlling operation of the hosted resources 318 and 320, as well as enablement of such resources for access and use by the users 316 of the premises based UC system 302. The configuration manager 304 thus can employ the enablement data for the resources to provision such resources for each of a plurality of users or user groups. The network portal 312 can be connected to the configuration system 342 via a firewall 346. Additionally, another firewall 348 can be connected between the premises VPC 340 and the configuration system 342. In this way, the multi-tenant resources and other components operating within the hosted UC system 314 can remain separate and isolated from the resources that reside within the premises VPC 340. The isolating function of the firewall 348 can be implemented via other resources, such as including a router or the like that enables communication to occur between the configuration system 342 and the VPC 340, for example.

As a further example, the mobility router resource 318 can include a mobility router that enables one or more mobile devices associated with one or more of the users 316 to be integrated within the premises based UC system to provide calm mobility. The mobility router resource 318, for example, can be a mobility router, such as is commercially available from ShoreTel, Inc. of Sunnyvale, Calif. The mobility router resource 318 can further include mobility data 350 for each of the users 316 for which the mobility resource has been enabled. The mobility data 350 can be stored in the configuration data 344 as disclosed herein and transferred to the mobility router resource 318. For example, the mobility data can include a mobility user name and mobility password associated with a mobile device 352 that belongs to a respective user 316 authorized for operation in the premises based UC system (see, e.g., Table 1).

In some examples, a user will have both an IP phone/analog phone and a Mobile phone. The configuration manager 304 can enable mobility service (e.g., residing in the premises based system 302 and/or the hosted system 314). Once activated by the configuration manager 304, the configuration manager can generate a shadow DN, a shadow User ID and shadow Password, which can be stored in the database of the premises system. These shadow credentials can be provided to the mobility router resource, such as part of the configuration data to the network portal 312 via the portal API.

In other examples, a user that may only have a Mobile phone or a user that does may not have such mobility service enabled. In this case the mobility router can register with the PBX username and SIP password assigned to the user. To simplify the configuration system 342 when both of these examples might exist, the sync control 306 can determine the correct username and password combination and send the appropriate data to the configuration system via the portal API 308.

Thus, in response to detecting calls (incoming/outgoing calls) for a given user, the PBX 322 can route the call to the mobility router resource 318 via the high-speed tunnel established between the CAR 332 and the CART 338 corresponding to the premises VPC 340. The mobility router resource can in turn redirect the call to the mobile device as appropriate based upon the variety of parameters. For example, the call can be routed to the mobile device 352 in response the mobility router resource analyzing the called number, caller ID, the type of call or other call related parameters that may be provided with the call-in information from the PBX 322.

As can be appreciated by those skilled in the art, portions of the invention may be embodied as a method, data processing system, or computer program product (e.g., a non-transitory computer readable medium having instructions executable by a processor). Accordingly, these portions of the invention may take the form of an entirely hardware embodiment, an entirely software embodiment, or an embodiment combining software and hardware. Furthermore, portions of the invention may be a computer program product on a computer-usable storage medium having computer readable program code on the medium. Any suitable non-transitory computer-readable medium may be utilized including, but not limited to, static and dynamic storage devices, hard disks, optical storage devices, and magnetic storage devices.

Certain embodiments are disclosed herein with reference to flowchart illustrations of methods, systems, and computer program products. It can be understood that blocks of the illustrations, and combinations of blocks in the illustrations, can be implemented by computer-executable instructions. These computer-executable instructions may be provided to one or more processor cores of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in a non-transitory computer-readable medium that can direct a computer or other programmable data processing apparatus (e.g., one or more processing core) to function in a particular manner, such that the instructions stored in the computer-readable medium result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks or the associated description.

What have been described above are examples. It is, of course, not possible to describe every conceivable combination of components or methodologies, but one of ordinary skill in the art will recognize that many further combinations and permutations are possible. For example, while some examples disclosed herein may seem to describe a primarily premises-based system that can leverage a hosted deployment of resources, the systems and methods disclosed herein can employ various combinations of differing amounts of hosted and premises-based resources according to user requirements. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. One or more non-transitory computer-readable media having instructions for performing a method, the method comprising:

providing account enable data from a multi-tenant hosted communication system to a given premises based communication system of a plurality of premises based communication systems, the multi-tenant hosted communication system being operated by an entity different from the given premises based communication system and including a cloud resource, the cloud resource being compatible with the plurality of different premises based communication systems and hosted within the multi-tenant hosted communication system;

receiving configuration data at the multi-tenant hosted communication system from the given premises based communication system, the configuration data including the account enable data and user data describing properties of each of a plurality of users in the given premises based communication system;

providing enablement data from the multi-tenant hosted communication system to the given premises based communication system to identify the cloud resource in the multi-tenant hosted communication system configured for the plurality of users based on the configuration data;

configuring a client access router at the given premises based communication system to provide a secure connection with a client access router termination at the multi-tenant hosted communication system, the secure connection further providing a mechanism for the given premises based communication system to access and utilize the cloud resource in the multi-tenant hosted communication system;

creating a virtual private cloud in the multi-tenant hosted communication system that is connected with the given premises based communication system through the secure connection between the client access router and the client access router termination; and synchronizing changes in the enablement data based on changes in the configuration data received from the given premises based communication system via the secure connection.

2. The media of claim 1, wherein the configuration data comprises a list of premises system users authorized for operating in the given premises based communication system.

3. The media of claim 1, wherein the cloud resource comprise at least one of a mobility router service, a fax service, a voicemail transcription service hosted as part of the multi-tenant hosted communication system.

4. The media of claim 1, wherein the cloud resource is a real time communications resource implemented in the virtual private cloud.

5. The media of claim 4, wherein the real time communications resource comprises a mobility router, the mobility router being configured based on the configuration data for at least one given user of the plurality of users to extend real time communications for the given user to a mobile device that is associated with the given user.

6. The media of claim 1, wherein the configuration data is received at the multi-tenant hosted communication system via a portal of the multi-tenant hosted communication system, the given premises based communication system including a portal interface to access the portal of the multi-tenant hosted communication system via the secure connection.

7. The media of claim 6, wherein the method further comprises:

receiving a configuration request at the portal via the portal interface; and providing router configuration data from the portal to the client access router, the client access router being programmed to communicate with the client access router termination via the secure connection that is established based on the router configuration data.

8. The media of claim 1, wherein the user data includes data identifying at least one group to which a proper subset of the plurality of users belongs, and wherein access to the cloud resource in the multi-tenant hosted communication system is provisioned separately for at least one of each user individually or each defined group of users based on the user data.

9. The media of claim 1, wherein the synchronizing comprises:

periodically receiving a query from the given premises based communication system for current configuration data; and sending updated account enable data to the given premises based communication system in response to the query.

10. The media of claim 1, wherein a portal of the multi-tenant hosted communication system is accessed via the secure connection between the client access router and the client access router termination, the portal being configured to control and manage enablement and access to at least one of a shared hosted resource and a private hosted resource of the multi-tenant hosted communication system for users of the plurality of premises based communication systems.

11. The media of claim 10, wherein the method further comprises receiving the user data, via the portal of the multi-tenant hosted communication system, the user data including an entire list of users authorized for operating in the given premises based communication system.

12. The media of claim 1, wherein the cloud resource further comprises at least one shared hosted resource and at least one private hosted resource, wherein each private hosted resource is implemented in the virtual private cloud, the secure connection providing a real time connection between the private hosted resource and the given premises based communication system.

13. A hybrid unified communication system, comprising:

a plurality of premises based communication systems, a given one of the plurality of premises based communication system comprising:

a configuration manager to establish and control user properties for the given premises based communication system, the configuration manager providing configuration data that includes account enable data and user data describing properties of each of a plurality of users in the given premises based communication system; and a client access router configured to provide a secure connection with a client access router termination at a multi-tenant hosted communication system; and the multi-tenant hosted communication system, which is operated by an entity different from the given premises based communication system, to provide enablement data to the given premises based communication system to identify at least one cloud resource in the multi-tenant hosted communication system configured for the plurality of users in the given premises based communication system based on the configuration data received from the given premises based communication system, the multi-tenant hosted communication system comprising:

a cloud resource compatible with each of the plurality of different premises based communication systems;

a secure connection being established between the client access router and the client access router termination, the secure connection further providing a mechanism for the given premises based communication system to access and utilize the cloud resource in the multi-tenant hosted communication system;

a virtual private cloud that is connected with the given premises based communication system through the secure connection between the client access router and the client access router termination; and a synchronization module to maintain synchronization between the configuration data of the given premises based communication system and the enablement data that is stored in the multi-tenant hosted communication system, the synchronization module further to synchronize changes in the enablement data based on changes in the configuration data received from the given premises based communication system via the secure connection.

14. The system of claim 13, wherein the given premises based communication system further comprises a portal interface that accesses a portal of the multi-tenant hosted communication system via the secure connection.

15. The system of claim 14, wherein the portal is configured to control and manage enablement and access to at least one of a shared hosted resource and a private hosted resource, wherein the shared hosted resource is configured for use among the plurality of premises based communication systems and the private hosted resource is implemented in the virtual private cloud and configured for use only by the given premises based communication system.

16. The system of claim 15, wherein the portal is configured to control and manage enablement and access to at least some of the hosted resources for users of the given premises based communication system, the hosted resources providing at least one of a real time or non-real time communications service.

17. The system of claim 16, wherein the account enable data comprises a unique identifier to identify the given premises based communication system,
   wherein the given premises based communication system is authenticated with the multi-tenant hosted communication system based on the unique identifier, wherein the user data is sent, via the portal, to the multi-tenant hosted communication system in response to the authentication of the given premises based communication system.

18. The system of claim 13, wherein the given premises based communication system further comprises local resources, resource controls to control access to the local resources by respective users based on the configuration data.

19. The system of claim 13, wherein the multi-tenant hosted communication system further comprises a shared hosted resource and a private hosted resource for users of the plurality of premises based communication systems, wherein the shared hosted resource provides a non-real time communication service and the private hosted resource provides a real time communication service.

20. The system of claim 13, wherein the cloud resource comprise at least one of a mobility router service, a fax service, a voicemail transcription service hosted as part of the multi-tenant hosted communication system.

* * * * *